United States Patent
Corghi

(10) Patent No.: US 9,180,744 B2
(45) Date of Patent: Nov. 10, 2015

(54) DEVICE FOR CENTRING THE RIM OF A WHEEL ON THE WHEEL-HOLDER UNIT OF A TYRE CHANGER MACHINE

(75) Inventor: Giulio Corghi, Correggio (IT)

(73) Assignee: CORGHI S.P.A., Correggio (IT)

( * ) Notice: Subject to any disclaimer, the term of this patent is extended or adjusted under 35 U.S.C. 154(b) by 773 days.

(21) Appl. No.: 13/477,287

(22) Filed: May 22, 2012

(65) Prior Publication Data

US 2012/0298314 A1 Nov. 29, 2012

(30) Foreign Application Priority Data

May 24, 2011 (IT) ................. BO2011A0300

(51) Int. Cl.
*B60C 25/138* (2006.01)
*B60C 25/132* (2006.01)

(52) U.S. Cl.
CPC ............ *B60C 25/138* (2013.01); *B60C 25/132* (2013.01)

(58) Field of Classification Search
CPC .... B60C 25/138; B60C 25/132; B60C 25/135
USPC ..................................... 157/14, 1.1
See application file for complete search history.

(56) References Cited

U.S. PATENT DOCUMENTS

| | | | |
|---|---|---|---|
| 3,930,530 A | 1/1976 | Askam | |
| 3,958,618 A | 5/1976 | Reuther | |
| 4,478,081 A * | 10/1984 | Greene | ................. G01M 1/045 157/21 |
| 5,656,775 A * | 8/1997 | Kawabe | ................... B60B 30/06 157/14 |
| 6,109,327 A | 8/2000 | Gonzaga | |
| 6,240,995 B1 | 6/2001 | Corghi | |
| 6,840,522 B2 * | 1/2005 | Merrifield | ................. B23P 6/00 157/14 |
| 7,293,595 B2 * | 11/2007 | Gonzaga | ............... B60C 25/132 157/1.1 |
| 2001/0042602 A1 | 11/2001 | Corghi | |
| 2006/0266481 A1 * | 11/2006 | Gonzaga | ............... B60C 25/132 157/14 |
| 2011/0100558 A1 * | 5/2011 | Corghi | .................. B60C 25/056 157/1.1 |
| 2013/0248120 A1 * | 9/2013 | Sotgiu | ..................... B60B 30/00 157/14 |

FOREIGN PATENT DOCUMENTS

| | | |
|---|---|---|
| EP | 0 947 360 A2 | 10/1999 |
| EP | 1 157 861 A2 | 11/2001 |
| EP | 1612064 A1 | 1/2006 |
| IT | VR 1996 000090 A1 | 4/1998 |
| IT | VR 2005 000059 A1 | 11/2006 |

* cited by examiner

*Primary Examiner* — Hadi Shakeri
*Assistant Examiner* — Danny Hong
(74) *Attorney, Agent, or Firm* — Pearne & Gordon LLP

(57) ABSTRACT

A device for centring the rim of a wheel on the wheel-holder unit of a tire changer machine comprises a first plate which can be positioned above the wheel-holder unit and coupled there for rotating integrally with it and equipped with a through opening which can be aligned with a central hole of the wheel-holder unit for allowing the insertion of a clamping rod in the hole through the opening, for locking the rim on the wheel-holder unit. The device also comprises a second plate forming a supporting surface (E) for the rim and equipped with its own through opening, the second plate being slidably positioned above the first plate and the device also comprises friction reduction means operatively interposed between the first plate and the second plate for facilitating their sliding relative to each other.

20 Claims, 4 Drawing Sheets

DEVICE FOR CENTRING THE RIM OF A WHEEL ON THE WHEEL-HOLDER UNIT OF A TYRE CHANGER MACHINE

BACKGROUND OF THE INVENTION

This invention relates to a device for centring the rim of a wheel on the wheel-holder unit of a tyre changer machine.

This invention also relates to a wheel-holder unit for a tyre changer machine comprising said device and the corresponding tyre changer machine.

The invention applies to the automotive technical field and, more specifically, to the sector of vehicle service equipment and tyre changer accessories.

In prior art wheel changer machines the wheel (in particular the rim of the wheel) is positioned by an operator on the wheel-holder unit (or tabletop) and, only then is centred relative to it by means of a clamping tool (or rod) equipped with a longitudinal shaft partly surrounded by a tapered portion (a device of that type is known from patent application EP 1157861 by this Applicant).

More precisely, during an initial step the rim is rested on the wheel-holder unit (which forms a horizontal supporting surface) by the operator, without any help (mechanical or other) which allows him to position the central hole of the rim so that it is coaxial with the central hole of the wheel-holder unit.

It is only at a later stage, during insertion of the above-mentioned shaft through the central holes of the rim and the wheel-holder unit that the rim is centred by the tangential action (that is to say, at a right angle to the direction of insertion) imparted by the tapered portion to the edges of the hole in the rim.

Consequently, the rim is translated tangentially on the wheel-holder unit from an off-centre position to a centred position by means of sliding of the hub of the rim on the wheel-holder unit itself.

Disadvantageously, that centring method is often subject to errors, since the friction force established between the rim and the wheel-holder unit tends to prevent sliding of the rim on the wheel-holder unit.

Indeed, sliding between the rim and the wheel-holder unit is only possible when the tangential component of the clamping force, imparted by the clamping device, is greater than the friction force between the rim and the wheel-holder unit, also depending on the clamping force.

In other words, the shape of the tapered portion transmits a fraction of the clamping force in a direction at a right angle to the direction of insertion of the tapered portion, that is to say, tangentially to the wheel-holder unit, so as to centre the rim.

However, when said tangential fraction is less than the friction force (generated by the clamping force multiplied by the friction coefficient between the rim and the wheel-holder unit), the rim can no longer slide on the wheel-holder unit.

Said problem is particularly evident when the operator places the rim in a position particularly offset from the central axis (that is to say, the axis of rotation) of the wheel-holder unit.

It should also be noticed that sliding between the rim and the wheel-holder unit tends to consume the surface of the rim.

This is particularly significant in operations for mounting or demounting tyres on or from rims of the "inverted" type, that is to say, having the extraction channel located in a position distal from the central hub compared with conventional rims (i.e.: the extraction channel is located close to an edge of the rim which is distal from the hub).

"Inverted" rims are mounted in the opposite way to conventional rims, that is to say, with the hollow facing upwards rather than towards the wheel-holder unit.

In light of this, it is clear how the surface on which the "inverted" rims rest is that which, during use, remains visible and consequently is of particular aesthetic value.

Therefore, it is clear that sliding of said surface on the wheel-holder unit during rim centring causes wear on the surface in a zone which, by its nature, must be kept integral and whose attractive appearance must be maintained.

For that purpose, in the prior art there is a centring device which overcomes said disadvantage.

Said device (or centring flange) comprises a flat disk from which multiple protuberances rise, arranged along a circle, for insertion in the rim mounting holes.

Consequently, the above-mentioned centring device can be coupled to the rim coaxially with it in such a way that they do not slide relative to each other. In practice, said device is interposed between the hub of the rim and the wheel-holder unit, thus avoiding deterioration of the rim during centring.

During centring it is the flat disk, and not the hub of the rim, that slides on the wheel-holder unit.

Disadvantageously, said device is particularly laborious to use since, before mounting it, precise adjustment is needed depending on the type of rim to be fitted.

In other words, the prior art centring device requires a set of preliminary operations to prepare it for mounting on the rim.

First, the distance between the mounting holes of the rim to be positioned on the wheel-holder unit must be measured, as well as the diameter of the circle along which said holes are distributed.

Then, the operator must adjust the device (and in particular the protuberances) depending on the information gathered, so as to put it in the correct configuration.

Only after said preliminary operations can the operator mount the device on the rim and position the assembly on the wheel-holder unit.

However, said device does not allow any guarantee of correct rim centring, since, as already indicated, if there is a significant offset between the rim (and the device) and the wheel-holder unit, the centring cone may not guarantee complete sliding of the rim relative to the wheel-holder unit.

It should be noticed that further prior art devices are known which can be interposed between the rim and the wheel-holder unit, although having aims and functions which are different to those of the centring device just described.

In particular, patent document IT1996VR00090 shows a tyre changer machine in which the wheel-holder unit is equipped with a clamping device which complements the tapered clamping tool.

More precisely, said device comprises a pair of disks which are concentric and superposed in such a way that they can rotate relative to each other and each having a groove in which spacer means are housed.

During rotation of the wheel-holder unit, the two disks are driven to rotate relative to each other and the spacer means (bearings or projections made in one piece with a disk) are brought out of the groove, forcing detachment of the two disks and increasing the clamping force on the rim.

It should be noticed that the two disks are constrained to remain coaxial with each other (i.e.: cannot be offset from or misaligned with each other) since they are coupled at respective through holes which allow the clamping tool to pass through them.

A very similar device is shown in patent document VR2005A00059.

As can be seen, the above-mentioned devices cannot be used as centring devices because they do not allow any radial movement (that is to say, at a right angle to the axis of rotation of the tabletop) of the rim.

In contrast, said devices are designed solely to increase the clamping force on the rim by means of an axial movement (that is to say, parallel with the axis of rotation of the tabletop) of one disk relative to the other, and in particular thanks to a movement of the upper disk (on which the rim rests) away from the lower disk (anchored to the machine frame).

U.S. Pat. No. 3,958,618A also shows a pair of elements abutted to each other and each able to rotate relative to the other. However, said device is applied to "heavy" tyre changer machines, that is to say, those having an axis of rotation of the wheel-holder unit which is substantially horizontal and therefore not subject to the problems covered in this document.

SUMMARY OF THE INVENTION

The aim of this invention is to provide a device for centring a rim of a wheel on the wheel-holder unit of a tyre changer machine which overcomes the above-mentioned disadvantages of the prior art.

In particular, this invention aims to provide a device for centring a rim of a wheel on the wheel-holder unit of a tyre changer machine which allows rapid, precise positioning of the rim.

A further aim of this invention is to provide a device for centring a rim of a wheel on the wheel-holder unit of a tyre changer machine which is simple and inexpensive to make.

Said aims are fulfilled by the device for centring a rim of a wheel on the wheel-holder unit (or tabletop) of a tyre changer machine according to this invention, comprising a first plate which can be positioned above the wheel-holder unit of the tyre changer machine and having an anchoring portion which can be coupled to the wheel-holder unit; said first plate being equipped with a through opening which can be positioned opposite a central hole in the tabletop.

According to the invention, the centring device is characterised in that it comprises a second plate forming a supporting surface for the rim and equipped with its own through opening, the second plate being slidably positioned above the first plate in such a way that it can move relative to it in a sliding plane along a trajectory having at least one radial component, for aligning and misaligning the through opening of the second plate relative to the through opening of the first plate; friction reduction means operatively interposed between the first plate and the second plate for facilitating their sliding relative to each other.

Therefore, the through opening of the second plate can be aligned and misaligned relative to the through opening of the first plate by sliding the second plate on the first plate.

In other words, the centring device comprises a pair of plates positioned one above the other and pierced which are free to slide one on top of the other in such a way that the second plate can translate on the first plate (and vice versa) in a sliding plane which is parallel with the first plate.

It should be noticed that, in practice, the term "radial" refers to a direction orientated away from the axis of rotation "B" of the wheel-holder unit (and lying in the sliding plane of the second plate 5).

The first plate can be anchored to the tabletop of the tyre changer machine (preferably centred relative to it).

The second plate acts as a support for the rim and translates by sliding relative to the first plate, tangentially to it, at least in two directions which are at right angles to each other (that is to say, it slides freely on the first plate in such a way as to facilitate centring of the rim).

To allow free sliding between the plates in practice (that is to say, when the clamping tool is inserted in the holes) at least the through opening in the second plate must be larger than the diameter of the clamping tool shaft (that is to say the cavity of the wheel-holder unit).

Preferably, the through openings in the plates are of different sizes (extension), in such a way that they remain opposite each other even after a radial movement of one plate relative to the other.

In particular, the through opening of the second plate is larger than the through opening of the first plate.

Preferably, in any operating position, the projection of the smaller opening (that of the first plate) is inscribed in the larger opening (that of the second plate).

The friction reduction means are operatively interposed between the two plates to facilitate the sliding of the second plate on the first plate.

Said friction reduction means may be of various types, for example mechanical (rolling elements), pneumatic (compressed air) or magnetic (electromagnet).

Preferably, the friction reduction means comprise a plurality of rolling bodies (rollers or preferably bearings) in such a way as to transform the sliding friction between the two plates into rolling friction (of a much lesser extent, almost negligible).

Advantageously, in this way the reduction of the friction is achieved simply and inexpensively.

To accentuate the effect of the friction reduction means, the centring device comprises the application, on an upper face (that is to say, the opposite face of the second plate to that giving onto the first plate), of a layer of material having a low abrasion coefficient and a high friction coefficient, preferably rubber, to prevent sliding of the rim and the second plate relative to each other.

Moreover, preferably, the centring device according to the invention comprises positioning means operatively interposed between the first and second plates and designed to position the second plate relative to the first plate in a preset initial home position.

In other words, the positioning means are active between the first and second plates parallel with the sliding plane of the second plate on the first plate so as to determine an (initial) zero position in which to place the first plate relative to the second plate.

Preferably, said means are of the elastic type and tend to place the first and second plates in such a way that the respective through openings are substantially coaxial.

The centring device also comprises at least one radial constraining element and an axial retaining element which are designed to give the device a single-block structure (that is to say, to prevent complete detachment of the parts).

BRIEF DESCRIPTION OF THE DRAWINGS

This and other features of the invention will become more apparent from the following detailed description of a preferred, non-limiting example embodiment of it, with reference to the accompanying drawings, in which.

DESCRIPTION OF THE PREFERRED EMBODIMENTS

Figure 1:
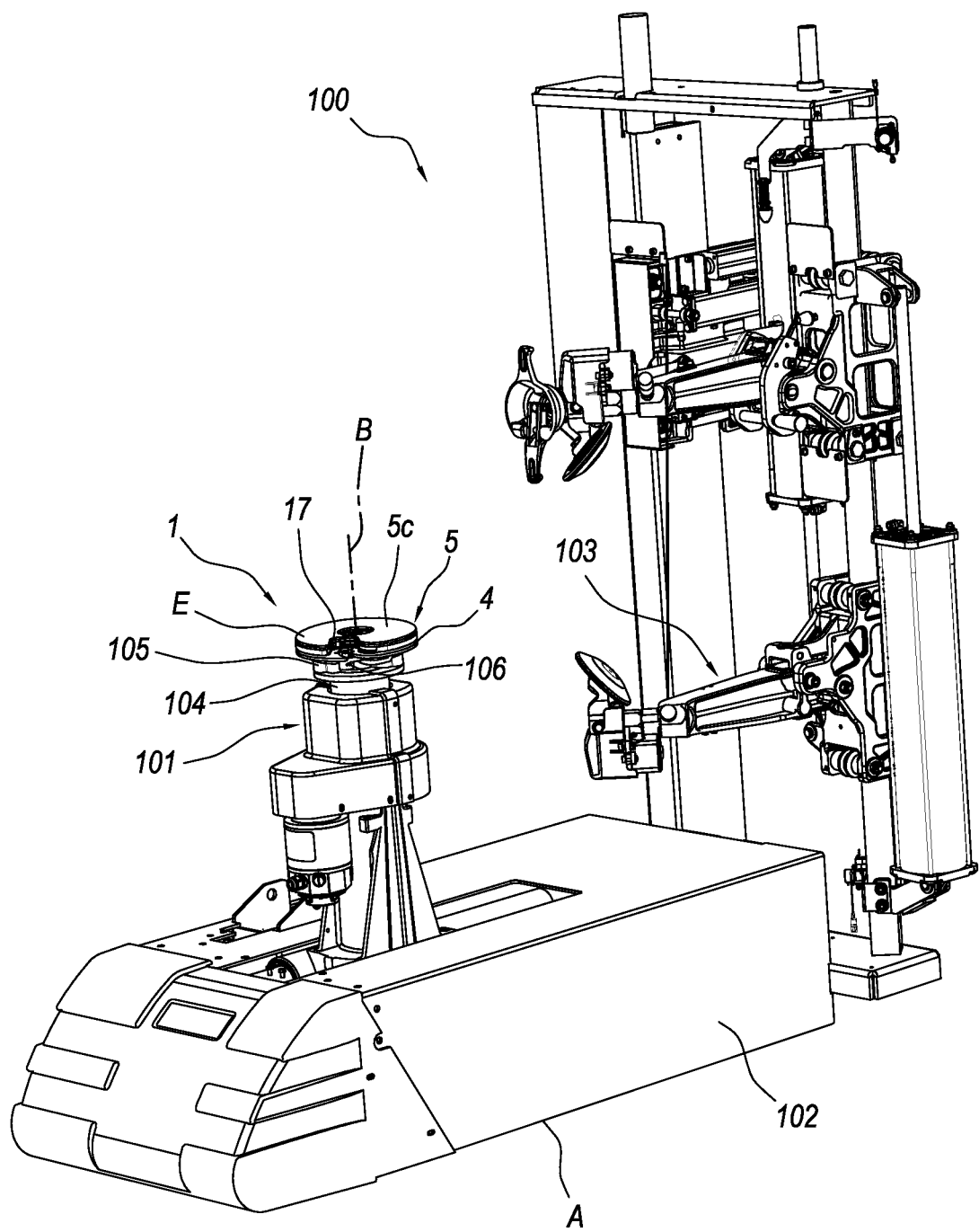
FIG. 1 is a perspective view of a tyre changer machine equipped with a centring device according to this invention.
Figure 2:
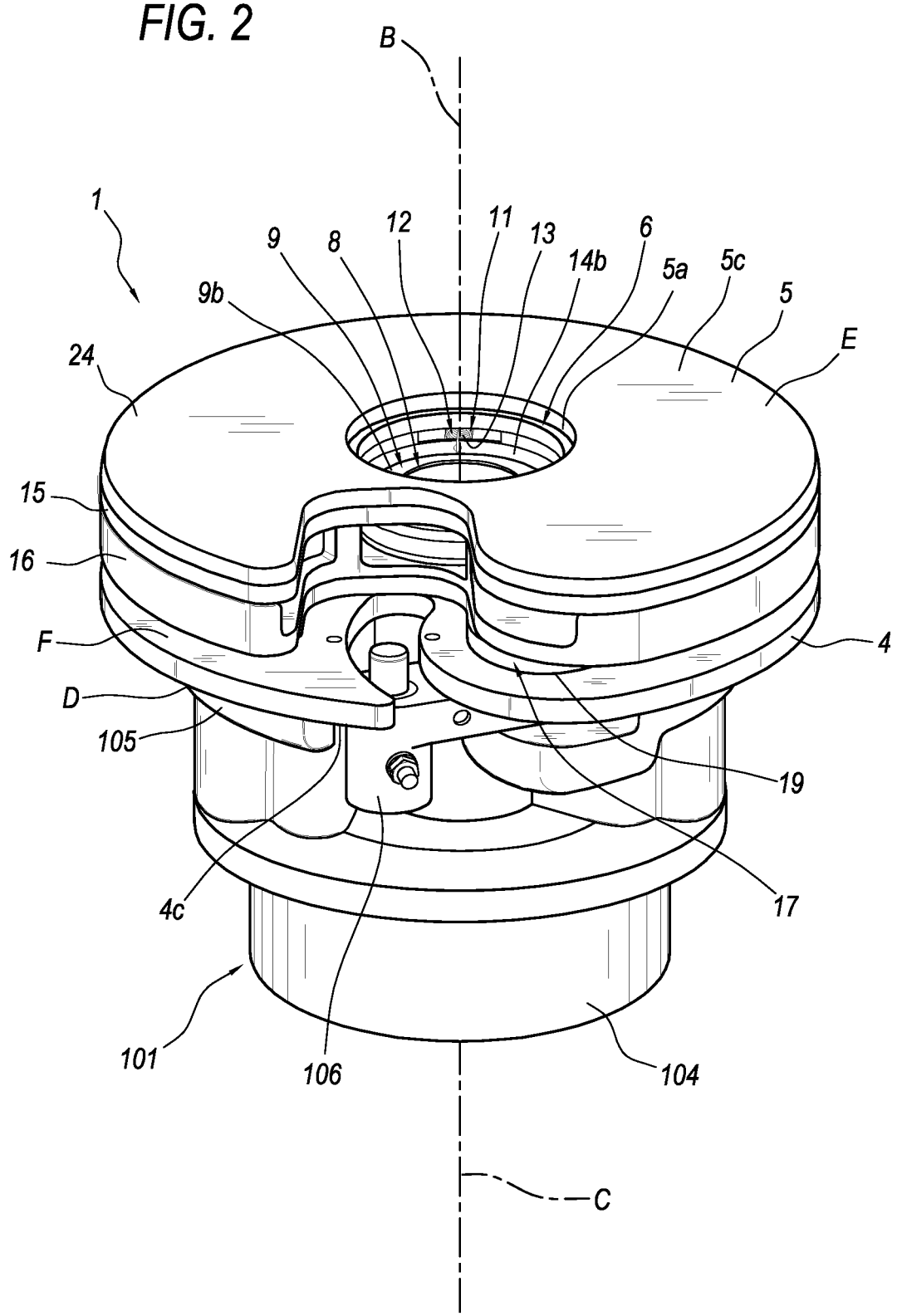
FIG. 2 illustrates a centring device according to this invention coupled to the wheel-holder unit of the tyre changer machine of FIG. 1.
Figure 3:
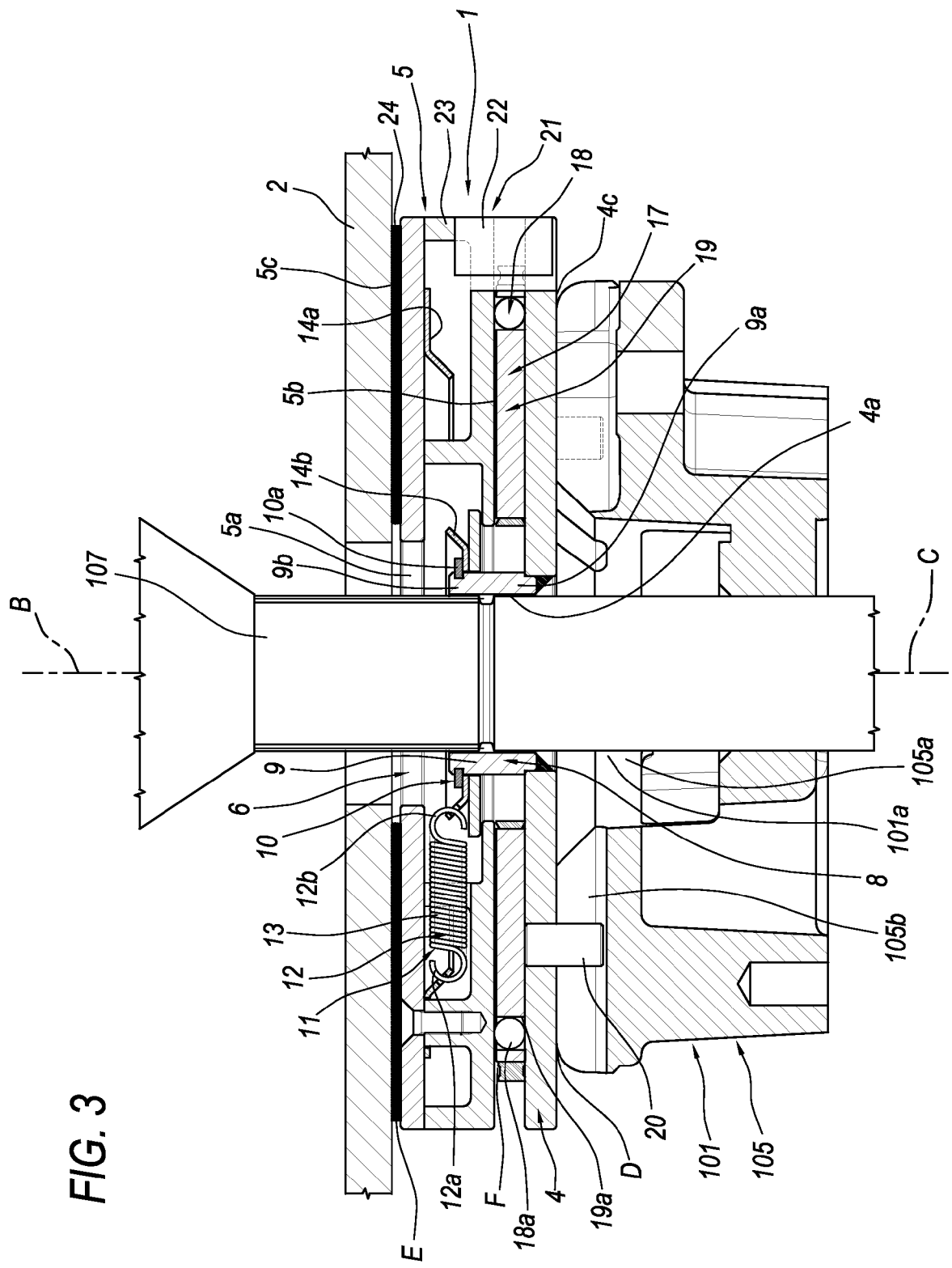
FIG. 3 is a cross-section of the device of FIG. 2.
Figure 4:
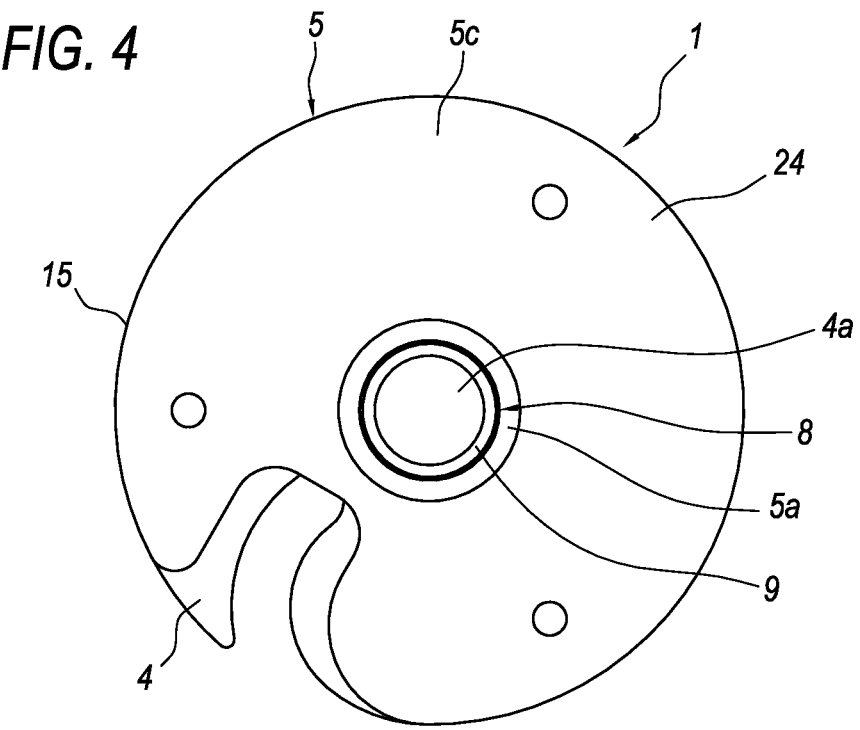
FIG. 4 is a top view of the device of FIG. 2.
Figure 5:
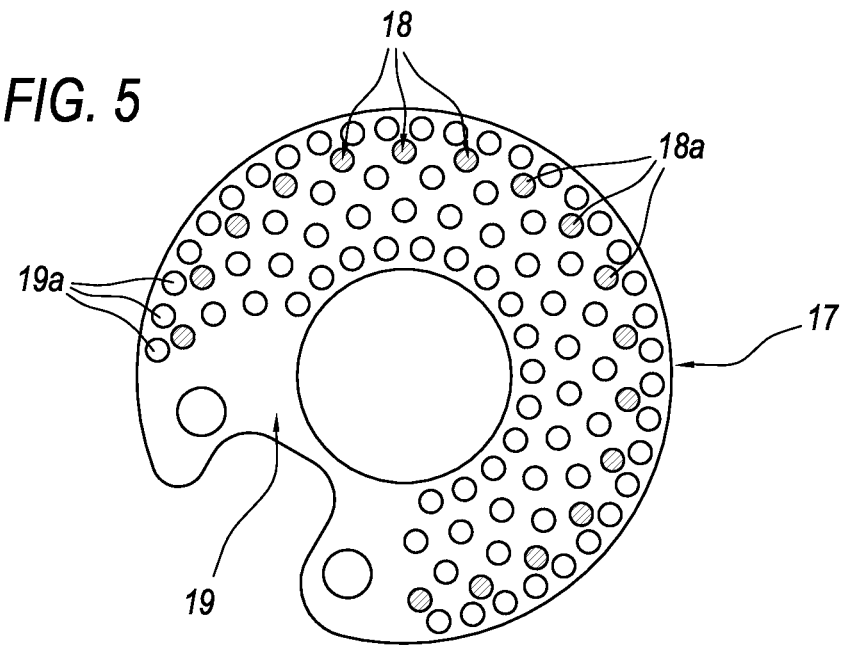
FIG. 5 is a top view of a component of the device of FIG. 2.

With reference to the accompanying drawings, the numeral 1 denotes a device for centring a rim 2 of a wheel on the tabletop 101 of a tyre changer machine 100.

The device 1 can be associated with a tyre changer machine 100 according to this invention, that is to say, a machine for mounting/demounting a tyre on/from a respective rim 2.

It should be noticed that the expression "tyre changer machine" is commonly understood to refer to a machine able to both mount the tyre on the rim 2 and to demount the tyre from the rim 2.

The tyre changer machine 100 comprises a base 102 for resting on a supporting surface "A", a wheel-holder unit 101 (or tabletop 101) which rotates relative to the base 102 about its own substantially vertical axis of rotation "B", and a tool unit (not illustrated) which moves vertically towards and/or away from the tabletop 101 for performing the tyre mounting/demounting operations.

Hereinafter, the term tabletop and the term wheel-holder unit will be used as synonyms.

The tyre changer machine 100 also comprises a bead breaker device 103 for separating the tyre from the rim 2.

The tabletop 101 of the machine 100 is designed for supporting the rim 2 from which or onto which the respective tyre will be demounted/mounted.

In other words, the tabletop 101 is designed for supporting the rim 2 and for making it rotate about the axis of rotation "B" to allow the mounting and demounting operations.

As already indicated, the axis of rotation "B" of the tabletop 101 is substantially vertical.

The tabletop 101 also comprises a central hole 101a for allowing a clamping tool (or rod) 107 to pass through it.

The clamping tool 107 is usually a longitudinal shaft comprising a tapered intermediate or end portion.

In the embodiment illustrated, the tabletop 101 comprises a hollow shaft 104 extending in its own main direction "C" (coinciding with the axis of rotation "B" of the tabletop 101) and a disk 105 for supporting a rim 2 comprising a central hole 105a at a cavity of the hollow shaft 104. The disk 105 is rigidly connected to a free end of the hollow shaft 104.

In practice, the central hole 105a of the disk 105 and the cavity of the shaft 104 allow a clamping tool (or rod) 107 to pass through.

More precisely, the tool is inserted in the cavity of the shaft 104 (after positioning the rim 2 on the centring device 1) then clamped, by means of a suitable mechanism, to keep the tapered portion pressing on the rim 2.

In contrast, the disk 105 forms a rim 2 (or centring device 1) sustaining surface "D", substantially parallel with the surface "A" supporting the tyre changer machine 100.

Moreover, to prevent the rim 2 (or the centring device 1) from rotating on the tabletop 101 during the tyre mounting/demounting operations, the tabletop 101 comprises an anti-rotation pin 106 able to move between a retracted position, in which it is below the sustaining surface "D" and an extracted position in which it projects above the sustaining surface for engaging the rim 2 so as to prevent any relative rotation between the tabletop 101 and the rim.

Alternatively, the anti-rotation pin 106 can move radially (that is to say, towards and away from the axis of rotation "B" of the tabletop 101).

Moreover, the tabletop 101 (and in particular the disk 105) comprises a plurality of mounting seats 105b to allow the anchoring of the centring device 1 according to this invention.

In the embodiment illustrated, the seats 105b are formed by radial grooves extending from the central hole 101a of the tabletop 101.

In other words, the grooves are made in the disk 105.

In the embodiment illustrated, the tabletop 101 comprises three grooves separated by equal angles (that is to say, 120° from each other).

The centring device 1 is associated with the tabletop 101 so that it rotates with it, and in particular it is mounted on top of the tabletop (that is to say, on the sustaining surface "D" formed by the disk 105).

The device 1 comprises a first plate 4 and a second plate 5, both pierced and positioned one above the other in such a way that they can slide freely relative to each other, at least in a preset movement area.

In other words, the first plate 4 comprises a portion for coupling with the tabletop 101.

In particular, a face 4c of the first plate 4 opposite to its face slidably coupled to the second plate 5 (that is to say, a lower face of the first plate 4) comprises a plurality of projections 20 which can engage with the respective seats 105b made in the wheel-holder unit 101 so as to prevent an angular movement of the first plate 4 relative to the wheel-holder unit 101.

In the embodiment illustrated, the first plate 4 comprises three projections 20 separated by equal angles, each of which can be inserted in a respective seat 105b in the tabletop 101.

The second plate 5 is rested on the first plate 4 in such a way that it can slide freely on it (that is to say tangentially to it) in at least two directions which are at right angles to each other.

In other words, the second plate 5 can translate on the first plate 4 both rigidly and in roto-translation.

According to the invention, between the two plates there are friction reduction means 17, described in more detail below.

In other words, the first plate 4 can be positioned above the tabletop 101 and comprises an anchoring portion 4a which can be fixed to the tabletop 101 (on the disk 105).

The second plate 5 is positioned above the first plate 4 in such a way as to form a supporting surface "E" for the rim 2 and slidably rests on the first plate 4, in a such a way that it translates tangentially to it (that is to say, sliding on the first plate 4).

Therefore, the first plate 4 forms (directly or indirectly) a sliding plane "F" of the second plate 5 on the first plate 4.

Moreover, the device 1 comprises friction reduction means 17 operatively interposed between the first plate 4 and the second plate 5 for facilitating the translation of the second plate 5 on the first plate 4 to allow centring of the rim 4 relative to the tabletop 101.

Advantageously, in this way the rim 2 (resting on the second plate 5) can slide on the first plate 4 (and therefore relative to the tabletop 101) in a simple way without there being any friction force preventing its movement.

Moreover, in this way, relative sliding between the rim and the surface on which it rests is eliminated.

To allow the clamping tool (rod) 107 to pass through, the first plate 4 comprises a through opening 4a which can be (is) positioned opposite the central hole 105a of the tabletop 101 (that is to say, of the disk 105).

Similarly, the second plate 5 comprises a through opening 5a opposite the central hole 101a of the tabletop 101.

In the embodiment illustrated, the through opening 5a of the second plate 5 is also opposite the through opening 4a of the first plate 4.

The term "opposite" means that the projection of one of the openings is always (at least in conditions of use) inscribed in the other opening.

For that purpose, at least the through opening 5a of the second plate 5 is larger than the diameter of the clamping tool 107 shaft (that is to say, the cavity of the hollow shaft 104 of the tabletop 101).

Preferably, the through openings 4a, 5a in the plates 4, 5 are of different sizes (extension), in such a way that they remain opposite each other even after a radial movement of one plate relative to the other.

In particular, the through opening 5a of the second plate 5 is larger than the through opening 4a of the first plate 4.

Preferably, in any operating position, the projection of the smaller through opening 4a (that of the first plate 4) is inscribed in the larger through opening 5a (that of the second plate 5).

In other words, the two through openings 4a, 5a have different extensions, that is to say, they form holes of different sizes, in which the projection of the smaller opening is always inscribed in the larger opening.

In this way, during sliding of the second plate 5 on the first plate 4 the opening 5a of the second plate 5 always remains aligned with at least part of the opening of the first plate 4, allowing the clamping tool 107 (in particular the longitudinal shaft) to pass through both.

In other words, the through openings 4a, 5a of the first plate 4 and the second plate 5 form a duct 6 one end of which is constantly opposite a central hole of the rim and the other opposite the central hole 105a of the tabletop 101 (that is to say, the cavity of the hollow shaft 104).

Said duct 6 is at least partly straight (in accordance with the fact that the through openings are constantly opposite) to allow the clamping tool 107 to pass through it.

In other words, in each condition of use (that is to say, in each operating position of the second plate 5 relative to the first plate 4) the duct 6 has at least one straight stretch whose volume is equal to the dimensions of the clamping rod 107.

The second plate 5 has an upper face 5c (forming the supporting surface "E" for the rim 2) equipped with a layer 24 of material having a low abrasion coefficient and a high friction coefficient, to prevent sliding of the rim 2 and the plate 5 relative to each other.

The term "upper" is used to define the position of the face 5c in operating conditions, that is to say, when the device 1 is mounted on the tabletop 101.

Consequently, the upper face 5c is facing in the opposite direction to the first plate 4 (that is to say, away from it).

In other words, the upper face 5c is the face of the second plate 5 opposite to its face which is slidably coupled with the first plate 4.

In the preferred embodiment, the upper face 5c of the second plate 5 is coated with a layer 24 of rubber, more preferably a oil-proof rubber.

Alternatively, the upper face 5c of the second plate 5 is coated with a layer of plastic which can easily be removed and substituted.

Advantageously, in this way the rim 2 remains securely in contact with the second plate 5 without any relative sliding causing wear on it.

It should be noticed that, between the rim 2 and the second plate 5 there is a high sliding friction component (given by the layer of rubber).

In contrast, between the first plate 4 and the second plate 5 said component is practically zero (thanks to the presence of the friction reduction means 17).

In this way, by applying a tangential force (that is to say, parallel with the sliding plane "F") on the rim 2, a relative movement of the two plates is obtained (where the resistance to said force is substantially zero), without there being sliding between the rim 2 and the second plate 5 (due to the considerable friction force between the two).

Preferably, the device comprises at least one radial constraining element 8 (or tangential stop body), which is engaged by the first plate 4 and can be engaged by the second plate 5 to limit the movement of the second plate 5 along the first plate 4.

Alternatively, the constraining element is engaged by the second plate 5 and can be engaged by the first plate 4.

Advantageously, the presence of the constraining element 8 limits the possibility of movement (sliding) of the second plate 5 relative to the first plate 4.

In other words, the constraining element 8 guarantees that the second plate 5 always remains resting on the first plate 4.

Preferably, the constraining element 8 is at least partly formed by a projecting (tubular) body 9 rising from the first plate 4 and inserted in the through opening 5a of the second plate 5 in such a way that it can be engaged by an edge of the through opening 5a, so as to limit the movement of the second plate 5 on the first plate 4. It should be noticed that the projecting body 9 is rigidly fixed to the first plate 4.

In particular, the projecting body 9 extends away from the first plate 4 from a first end 9a, positioned at an edge of the through opening 4a of said first plate 4, to a second end 9b, positioned at a height engageable by the through opening 5a of the second plate 5 (that is to say, by the edge of said opening).

In the embodiment illustrated, the projecting body 9 has a substantially tubular shape and at least partly (preferably completely) surrounds the through opening 4a of the first plate 4.

More precisely, the projecting body 9 has an inner cavity 9c forming the through opening 4a of the first plate 4.

Consequently, the cavity 9c of the projecting body 9 has a substantially circular cross-section.

Therefore, in the embodiment illustrated, the first plate 4 and the projecting body 9 form a disk-shaped element with a hollow central protuberance.

In accordance with that embodiment, the second plate 5 has a substantially annular shape in such a way that it fits around the tubular projecting body 9.

Preferably, the cavity 9c of the projecting body 9 has a diameter corresponding to the diameter of the central hole 101a of the tabletop 101 (that is to say, of the cavity 102a of the hollow shaft 102).

In an alternative embodiment, the constraining body could extend around the second plate, stopping the movement of the second plate in the style of an enclosure.

It should be noticed that said "enclosure" may similarly extend a from the first plate for constraining the second or vice versa, or from the second plate for engaging with the first.

In other words, in that embodiment, the first (or the second) plate has a concave shape with the lateral edges raised for containing the radial movement of the other plate.

Preferably, the device 1 comprises positioning means 11 operatively interposed between the first plate 4 and the second plate 5 and designed to position the second plate 5 in a preset starting (home) position relative to the first plate 4.

In other words, the positioning means 11 allow the device to be given a starting (home) configuration in which, preferably, the two through openings 4a, 5a of the two plates 4, 5 are coaxial (aligned).

In the preferred embodiment, the positioning means 11 are of the elastic type (that is to say, they are elastic return means).

In other words, the positioning means 11 comprise at least one elastic return element 12 operating between the first plate 4 and the second plate 5 along the sliding plane "F" of the second plate 5 relative to the first plate 4.

Consequently, the positioning means 11 have a tangential operating direction, preferably orientated radially relative to the axis of rotation "B" of the tabletop 101.

In light of this, the positioning means 11 comprise a plurality of said elastic return elements 12 spaced at equal angles around the through opening 4a of the first plate 4.

Each elastic return element 12 extends between its first end 12a anchored to the second plate 5 (preferably in a peripheral zone of it) and a second end 12b anchored to the first plate (preferably in a central zone, or close to the through opening 4a).

In the embodiment illustrated, each elastic return element 12 comprises a helical spring 13 with one end connected to the second plate 5 and the other end connected to the projecting element 8 of the stop body 9.

In particular, the positioning means 11 comprise three helical springs 13 offset from each other by approximately 120 degrees.

More precisely, the positioning means 11 comprise two substantially circular flanges 14a, 14b positioned one inside the other.

The flange with the larger diameter 14a is rigidly connected to a peripheral portion of the second plate 5.

Preferably, the flange 14a (with the larger diameter) is fixed to the second plate 5 by fixing elements such as screws, rivets or the like.

The flange 14b with the smaller diameter is fitted around the projecting body 9.

The term "fitted" refers to the fact that the flange 14b with the smaller diameter is inserted around the projecting body.

The helical springs 13 each have one end associated with the flange 14a with the larger diameter and one end associated with the flange 14b with the smaller diameter.

Preferably, the positioning means 11 are interposed between a first sheet 15 and a second sheet 16 which are substantially parallel and opposite.

Therefore, in the embodiment illustrated, the second plate is formed by three superposed layers, a first layer formed by the first sheet 15, a second layer formed by the positioning means 11 (that is to say, the flange 14a and the springs) and a third layer formed by the second sheet 16.

Said layers are rigidly fixed to each other, by suitable screws, rivets or the like in such a way that they can translate as a single body relative to the first plate 4.

The first sheet 15 is distal from the first plate 4 and forms the supporting surface "E" for the rim 2. Consequently, the first sheet 15 forms the upper face 5c of the second plate 5.

The second sheet 16 is proximal to the first plate and forms a resting element (direct or indirect, depending on the type of friction reduction means) of the second plate 5 on the first plate 4.

Moreover, preferably the device 1 comprises axial retaining means 10 (that is to say, at a right angle to the first plate 4) designed to prevent the second plate from moving away from the first plate 4 in a direction at a right angle to the plates 4, 5, and vice versa.

Advantageously, in this way the structure of the device 1 adopts a compact and easily handled/transportable configuration.

It should be noticed that the terms "axial" and "radial" refer to the device 1 during use, and in particular to the axis of rotation "B" of the tabletop 101.

Consequently, the term "radial" refers to a direction orientated away from the axis of rotation "B" (and lying in the sliding plane of the second plate 5).

In contrast, the term "axial" refers to a direction parallel with the axis of rotation "B" and therefore at a right angle to the plates 4, 5.

In the embodiment illustrated, the axial retaining means 10 comprise a contact element 10a fixed to the first plate 4 and which can be engaged by the second plate 5 or vice versa.

In other words, the second plate 5 is at least partly interposed between the first plate 4 and the contact element 10a.

More precisely, the contact element 10a is rigidly connected (in particular axially integral) with the projecting element 9 of the stop body 8, close to the second end 9c, and projects radially from it in such a way as to engage with the second plate 5 (or an element connected to it) in the axial direction (that is to say, in the direction of extension of the projecting element 9).

In the embodiment illustrated, the contact element 10a comprises a Seeger® snap ring inserted in a suitable groove in the projecting element 9 (close to the second end 9c).

The friction reduction means 17 are operatively interposed between the two plates 4, 5 to facilitate the sliding of the second plate 5 on the first plate 4.

Said friction reduction means may be of various types, for example mechanical (rolling elements), pneumatic (compressed air) or magnetic (electromagnet).

Said means are designed to reduce the friction component between the two plates 4, 5 in such a way as to favour their sliding relative to each other during insertion of the clamping tool 107 (and in particular of the tapered portion of it).

Preferably, the friction reduction means comprise a plurality of rolling bodies 18 (rollers or preferably bearings) interposed between the two plates 4, 5 and designed to transform the sliding friction between the two plates into rolling friction (of a much lesser extent, almost negligible).

Advantageously, in this way the reduction of the friction is achieved simply and inexpensively. Preferably, the friction reduction means 17 comprise a containment element 19 (or bracket) made of plastic material and with a plurality of housing seats 19a shaped (and sized) for receiving the rolling bodies 18.

In the embodiment, the rolling bodies 18 are bearings 18a made of plastic or metal.

To allow the bearings 18a to roll, the housing seats 19a of the containment element 19 are sized to allow the bearings 18a to project (at the top and/or bottom) in such a way as to hold them in rolling contact with the first plate 4 and/or the second plate 5.

For simple construction, the housing seats 19a are through holes, whose length is less than the diameter of the bearings 18a. In particular, the thickness of the containment element 19 is less than the diameter of the bearings 18a.

The containment element 19 is preferably bracket-shaped in such a way that it is positioned around the through openings 4a, 5a of the plates 4, 5.

Similarly, the housing seats 19a are angularly distributed in a substantially circular way along the extension of the bracket.

The containment element can preferably be constrained to one of the two plates to facilitate mounting (assembly) of the device and improve its operation.

In particular, the containment element 19 comprises two notches which can be coupled with respective protuberances projecting from the first plate 4 (more precisely from the face of the first plate 4 in contact with the containment element 19). Said coupling allows a play (that is to say relative movement) between the first plate 4 and the containment element 19, since it is not necessary for said components to be rigidly constrained to each other.

As already indicated, in alternative embodiments, the friction reduction means could be of different types.

For example, it is possible to use resources already present in the operating system (that is to say, the tyre changer machine 100) such as compressed air.

In light of this, it is possible to switch on and off a jet of compressed air between the two plates 4, 5 during insertion of the clamping rod 107, in such a way as to cause the plates 4, 5 to detach from each other for a time such that it allows their sliding relative to each other.

Alternatively it is possible to use magnetic means, such as an electromagnet which can be activated similarly to the source of compressed air described above.

In a more economical embodiment, the device could comprise two plates with the same polarity, in such a way that each repels the other.

Obviously, for safety, in such a circumstance the axial retaining means would take on particular significance.

It should be noticed that, in principle, it could be sufficient to insert an anti-adhering layer (such as oil or grease) between the two plates.

Preferably, the centring device 1 also comprises an anti-rotation system 21 operating between the first plate 4 and the second plate 5 and designed to limit the relative rotation between the first plate 4 and the second plate 5 to a preset arc of a circle.

In other words, the anti-rotation system 21 is designed to allow a limited relative rotation between the two plates, for example during centring, and to ensure that they rotate integrally with each other once that limit is passed.

In the embodiment illustrated, the anti-rotation system 21 is formed by the shape of the two plates 4, 5.

In particular, the first plate 4 comprises a perimetric recess 22 extending around the periphery of it for a length equal to the preset arc of a circle and the second plate 5 comprises a tooth 23 projecting transversally to it towards the first plate at the recess 22.

In practice, the tooth 23 can slide in the recess 22 between two end of stroke positions during rotation of the second plate 5 on the first plate 4.

Alternatively, in other embodiments the device does not comprise its own anti-rotation system, but uses the anti-rotation pin 106 of the tabletop 101 (or an extension of it).

For that purpose, both the first plate 4 and the second plate 5 comprise slots which can be aligned with each other and are designed to have the anti-rotation pin 106 pass through them.

In practice, an operator prepares the centring device 1 and couples it to the top of the wheel-holder unit (or tabletop) 101 in such a way that it can rotate integrally with it.

Then, the operator positions the rim 2 on the upper face 5c of the centring device 1, in such a way that the hole in the rim is at least partly above a through opening 5a of the centring device 1 and a central hole of the wheel-holder unit 101.

Then, the locking rod is inserted in the hole of the wheel-holder unit 101 through the hole in the rim 2 and the through-opening 4a, 5a of the centring device 1 (that is to say, the device 1 duct 6).

Finally, by means of an anti-rotation system, the rim 2 is locked relative to the wheel-holder unit 101 and/or relative to the centring device 1.

The invention achieves the preset aims and brings important advantages.

The free sliding of the two plates allows simple centring of the rim without sliding between the rim and the surface on which it rests.

Moreover, the presence of friction reduction means allows precise centring for any positioning of the rim by the operator.

Moreover, the use of rolling bearings makes production of the device particularly simple and inexpensive, as well as reliable.

Furthermore, the presence of the radial constraining and axial retaining elements allows the device to maintain a compact, single-block structure, which is easy to handle and install.

Finally, the use of projections which can be coupled with the tabletop makes installation of the device fast and easy.

It should be noticed that, as an alternative embodiment of this invention, protection also extends to a wheel-holder unit comprising an integrated centring device, where said centring device is made as described above.

What is claimed is:

1. A device for centring the rim (2) of a wheel on the wheel-holder unit (101) of a tyre changer machine (100), comprising a first plate (4) which can be positioned above the wheel-holder unit (101) and coupled there for rotating integrally with it; the first plate (4) comprising a through opening (4a) which can be aligned with a central hole (101a) of the wheel-holder unit (101) for allowing the insertion of a clamping rod (107) in the hole through the opening (4a), for locking the rim (2) on the wheel-holder unit (101), wherein it comprises:

a second plate (5) defining a supporting surface (E) for the rim (2) and comprising its own through opening (5a), the second plate (5) being slidably positioned above the first plate (4) in such a way that it can move relative to it in a sliding plane (F) along a trajectory which has at least one radial component, for aligning and misaligning the through opening (5a) of the second plate (5) relative to the through opening (4a) of the first plate (4);

friction reducing means (17) operatively interposed between the first plate (4) and the second plate (5) for facilitating their relative sliding.

2. The centring device according to claim 1, wherein the through openings (4a, 5a) of the first plate (4) and the second plate (5) have respective central axes which can be misaligned during movement of the second plate (5) on the first plate (4).

3. The centring device according to claim 1, comprising at least one radial constraining element (8) engaged by the first plate (4) and which can be engaged by the second plate (5) for limiting sliding of the second plate (5) along the first plate (4), or vice versa.

4. The centring device according to claim 3, wherein the constraining element (8) is at least partly formed by a tubular projecting body (9) rising from the first plate (4) and operatively inserted in the through opening (5a) of the second plate (5) in such a way that it can be engaged by an edge of the through opening (5a), so as to limit the movement of the second plate (5) on the first plate (4).

5. The centring device according to claim 4, wherein the through opening (5a) of the second plate (5) has a greater extension than the through opening (4a) of the first plate (4), for remaining opposite to it during movement of the second plate (5) on the first plate (4).

6. The centring device according to claim 1, comprising axial retaining means (10) designed to limit the movement of the second plate (5) away from the first plate (4) in a direction at a right angle to the plates, and vice versa.

7. The centring device according to claim 6, wherein the axial retaining means (10) are formed by a contact element (10a) fixed to the first plate (4) and which can be engaged by the second plate (5) or vice versa; the second plate (5) being at least partly interposed between the first plate (4) and the contact element (10a).

8. The centring device according to claim 1, comprising positioning means (11) connected to the first plate (4) and to the second plate (5) for positioning the second plate (5) relative to the first plate (4) in a predetermined home starting position.

9. The centring device according to claim 8, wherein the positioning means (11) comprise at least one elastic return element (12) operating between the first plate (4) and the second plate (5) at least in a direction parallel with the sliding plane (F) of the second plate (5) relative to the first plate (4).

10. The centring device according to claim 9, wherein the positioning means (11) comprise a plurality of elastic return elements (12) spaced at equal angles around the through opening (4a) of the first plate (4).

11. The centring device according to claim 1, wherein a face (5c) of the second plate (5), opposite to its face (5b) which is slidably coupled to the first plate (4a), is coated with a layer of material having a low abrasion coefficient and a high friction coefficient, for preventing sliding of the rim (2) relative to the second plate (5).

12. The centring device according to claim 1, wherein the friction reduction means (17) comprise a plurality of rolling bodies (18) interposed between the first plate (4) and the second plate (5).

13. The centring device according to claim 12, wherein the friction reduction means (17) comprise a containment element (19) made of plastic material and comprising a plurality of housing seats (19a), each shaped for receiving a rolling body (18).

14. The centring device according to claim 1, comprising an anti-rotation system operating between the first plate (4) and the second plate (5) and designed to limit the relative angle of rotation between the first plate (4) and the second plate (5) to a predetermined angular value, in such a way that the first plate (4) drives the second plate (5) to rotate integrally with the wheel-holder unit (101), after a rotation of the two plates relative to each other which is not greater than said angular value.

15. The centring device according to claim 14, wherein the first plate (4) comprises a perimetric recess (22) extending around the periphery of it for a length equal to a preset arc of a circle, corresponding to the predetermined angular value, and the second plate (5) comprises a tooth (23) projecting transversally to it towards the first plate matching the recess (22); the tooth (23) being able to slide in the recess (22) between two end positions during a rotation of the second plate (5) on the first plate (4).

16. The centring device according to claim 1, wherein a face (4c) of the first plate (4) opposite to its face slidably coupled to the second plate (5) comprises a plurality of projections (20) which can engage with the respective seats (105b) made in the wheel-holder unit (101) so as to prevent an angular movement of the first plate (4) relative to the wheel-holder unit (101).

17. A rotary supporting apparatus for a wheel for a wheel changer machine, equipped with a rotary wheel-holder unit comprising:
 a hollow shaft (104) extending in its own main direction (C);
 a supporting disk (105) for a rim (2) comprising a central hole (105a) at the cavity (104a) of the hollow shaft (104) and connected to a free end of the hollow shaft (104), wherein it comprises a centring device (1) according to claim 1, operatively coupled to the top of the disk (104) in such a way that it rotates integrally with it.

18. The apparatus according to claim 17, wherein the through opening (5a) of the second plate (5) has a greater extension than the central hole (101a) of the wheel-holder unit (101) for allowing a movement of the second plate (5) and the wheel-holder unit (101) relative to each other.

19. A tyre changer machine, comprising:
 a base (102);
 a wheel-holder unit (101) associated with the base (102) and able to rotate relative to the base (102) about a substantially vertical axis of rotation (B);
 a centring device (1) according to claim 1, rigidly connected to the top of the wheel-holder unit (101).

20. A method for mounting a rim (2) on the rotary wheel-holder unit of a tyre changer machine, wherein it comprises the following steps:
 preparing a centring device (1) according to claim 1 and coupling it to the top of the wheel-holder unit (101) in such a way that it can rotate integrally with it;
 positioning the rim (2) on an upper face (5c) of the centring device (1), in such a way that the hole in the rim (2) is at least partly above a through opening (5a) of the centring device (1) and a central hole (101a) of the wheel-holder unit (101);
 inserting a clamping rod (107) in the central hole (101a) of the wheel-holder unit (101) through the hole in the rim (2) and the through opening (5a) of the centring device (1);
 locking the rim (2) relative to the wheel-holder unit (101) in such a way that the rim (2) is coaxial with the wheel-holder unit (101).

* * * * *